United States Patent [19]

Taner et al.

[11] 4,259,733
[45] Mar. 31, 1981

[54] MULTI-DIMENSIONAL SEISMIC IMAGING

[75] Inventors: M. Turhan Taner; Robert E. Sheriff, both of Houston, Tex.; Fulton Koehler, Minneapolis, Minn.

[73] Assignee: Seiscom Delta, Inc., Houston, Tex.

[21] Appl. No.: 38,818

[22] Filed: May 14, 1979

[51] Int. Cl.³ .............................................. G01V 1/28
[52] U.S. Cl. ........................................ 367/61; 367/62; 367/50
[58] Field of Search ....................... 367/21, 38, 50, 59, 367/60, 61, 62

[56] References Cited

U.S. PATENT DOCUMENTS

| 2,732,906 | 1/1956 | Mayne |
| 3,040,833 | 6/1962 | Mendenhall et al. |
| 3,353,151 | 11/1967 | Rockwell | 367/38 |
| 3,689,873 | 9/1972 | Weller | 367/61 |
| 3,774,146 | 11/1973 | Goupillard | 367/62 |
| 4,072,922 | 2/1978 | Taner et al. |

OTHER PUBLICATIONS

*Introduction to Geophysical Prospecting*, Dobrin, 3rd edition, 1976.

*Primary Examiner*—Howard A. Birmiel
*Attorney, Agent, or Firm*—Pravel, Gambrell, Hewitt, Kirk, Kimball & Dodge

[57] ABSTRACT

Seismic traces synthesizing the response of subsurface formations to a cylindrical or plane wave are obtained for a succession of shotpoint locations along a seismic line of profile. The traces obtained are then wavefront steered and the steered traces and original trace for each shotpoint are summed. Groups of these traces for a line of profile are assembled to form a steered section. A number of these sections are then individually imaged or migrated, and the migrated sections are summed to form a migrated two-dimensional stack of data from cylindrical or plane wave exploration. Reflectors may then be located by finding common tangents.

The traces for those shotpoints of the several lines which lie in planes perpendicular to the lines are then assembled and processed in the foregoing manner to obtain three dimension migrated seismic data.

6 Claims, 6 Drawing Figures

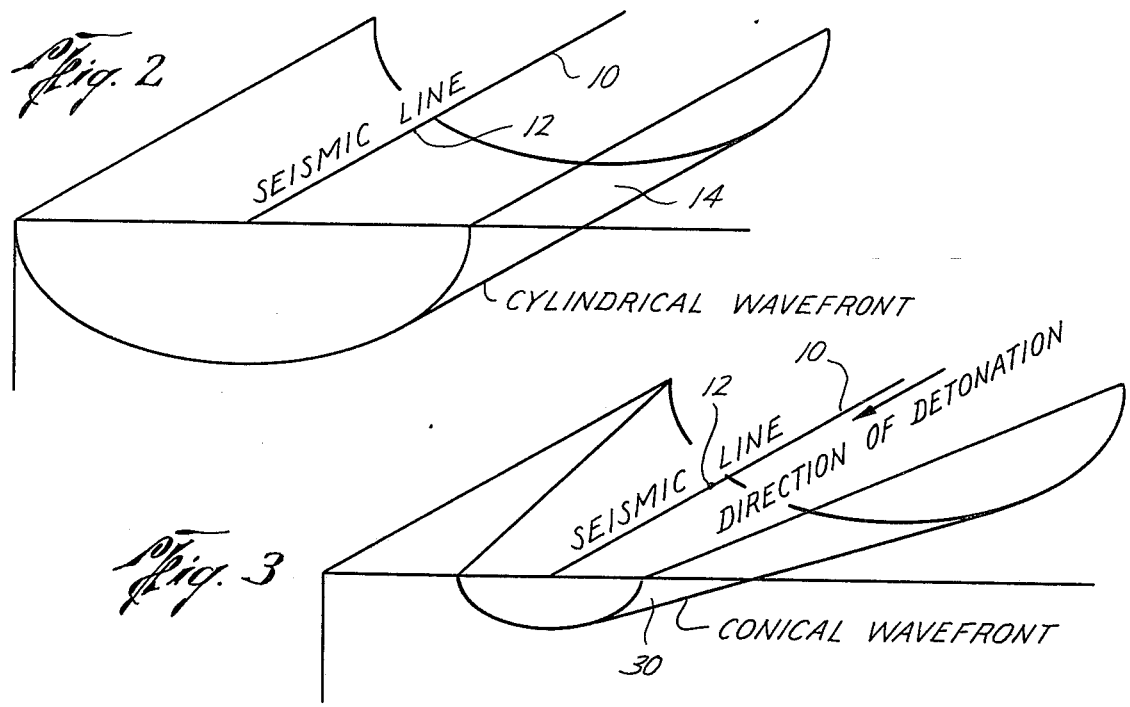
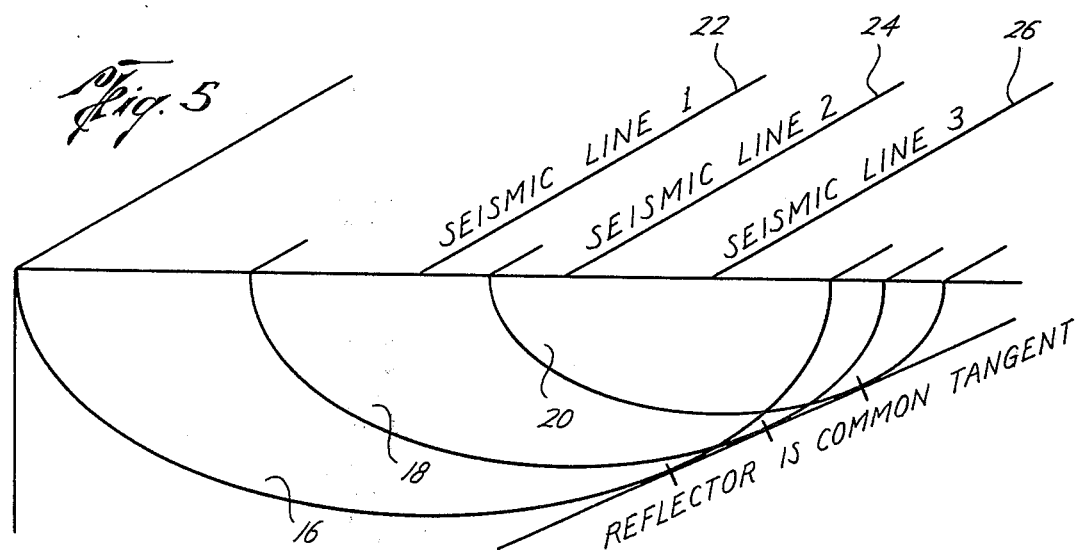
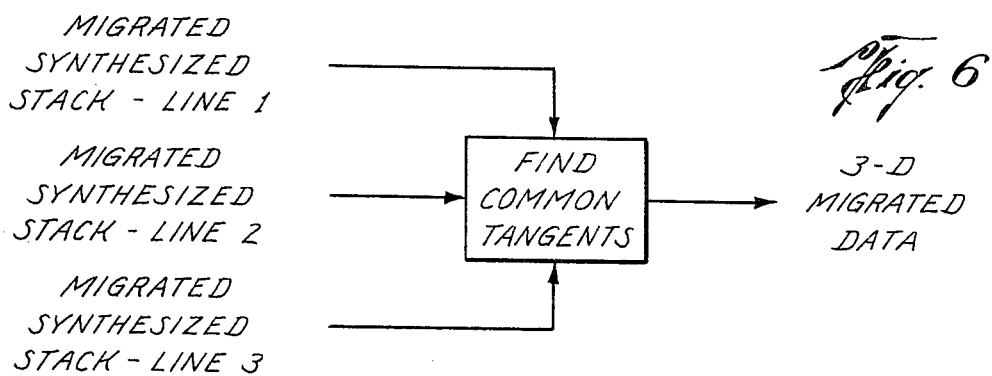

MULTI-DIMENSIONAL SEISMIC IMAGING

BACKGROUND OF INVENTION

1. Field of Invention

The present invention relates to multi-dimensional imaging of seismic data.

2. Description of the Prior Art

In the past, one highly used seismic data acquisition and processing technique has been common depth point, or CDP, stacking, as described in U.S. Pat. Nos. 2,732,906 and 3,040,833. This technique is predicated on several assumptions that affect the accuracy of displayed data processed in this manner.

First, it has been assumed that CDP data are from a common depth point in the earth. This is not, however, accurate, since the assumption is true only for each subsurface reflecting layer which is horizontal. It is an unusual situation for layers to be horizontal in areas of interest for hydrocarbon exploration. Second, CDP processing required that the seismic traces be corrected for normal moveout (NMO). A non-linear distortion effect on the seismic traces was introduced by NMO correction, due to the stretching of data portions of the traces during correction.

SUMMARY OF INVENTION

Briefly, the present invention provides a new and improved method of obtaining multi-dimensional imaged seismic data. Seismic traces synthesizing the response of subsurface formations to cylindrical or plane waves are obtained for a succession of shotpoint locations along a seismic line of profile. The traces obtained are then shifted so as to produce the effect of a steered or beamed wavefront and the steered traces and original trace for each shotpoint are summed to form a synthesized trace for a beamed wavefront. The synthesized traces are then collected into sets are assembled to form a plurality of synthesized sections, beamed vertically downward and in other directions. A number of these sections are then individually imaged or migrated, and the migrated sections are summed to form a migrated two-dimensional stack of data from cylindrical or plane wave exploration. Reflectors are located correctly in the in-line direction.

The traces for those shotpoints of the several lines which lie in planes perpendicular to the lines are then assembled and processed in the foregoing manner to obtain three-dimension migrated seismic data.

The synthesized traces migrate to correct locations regardless of wavefront steering, whereas random noise elements in the data appear differently, based on the amount of steering. Thus, by means of steering the wavefronts and summing, an improvement in signal-to-noise ratio of the seismic data is obtained.

When a number of parallel lines of profile are obtained in accordance with the present invention, they may then be processed without any limiting assumption as to cross-dip.

BRIEF DESCRIPTION OF THE DRAWINGS

FIG. 1 is a schematic diagram of a portion of the process of the present invention;

FIGS. 2 and 3 are graphic models of seismic wavefronts synthesized by the method of FIG. 1;

FIGS. 4 and 6 are schematic diagrams of further portions of the process of the present invention; and FIG. 5 is a graphic model of seismic wavefronts synthesized by the method of FIGS. 4 and 6.

DESCRIPTION OF PREFERRED EMBODIMENT

Figure 4:
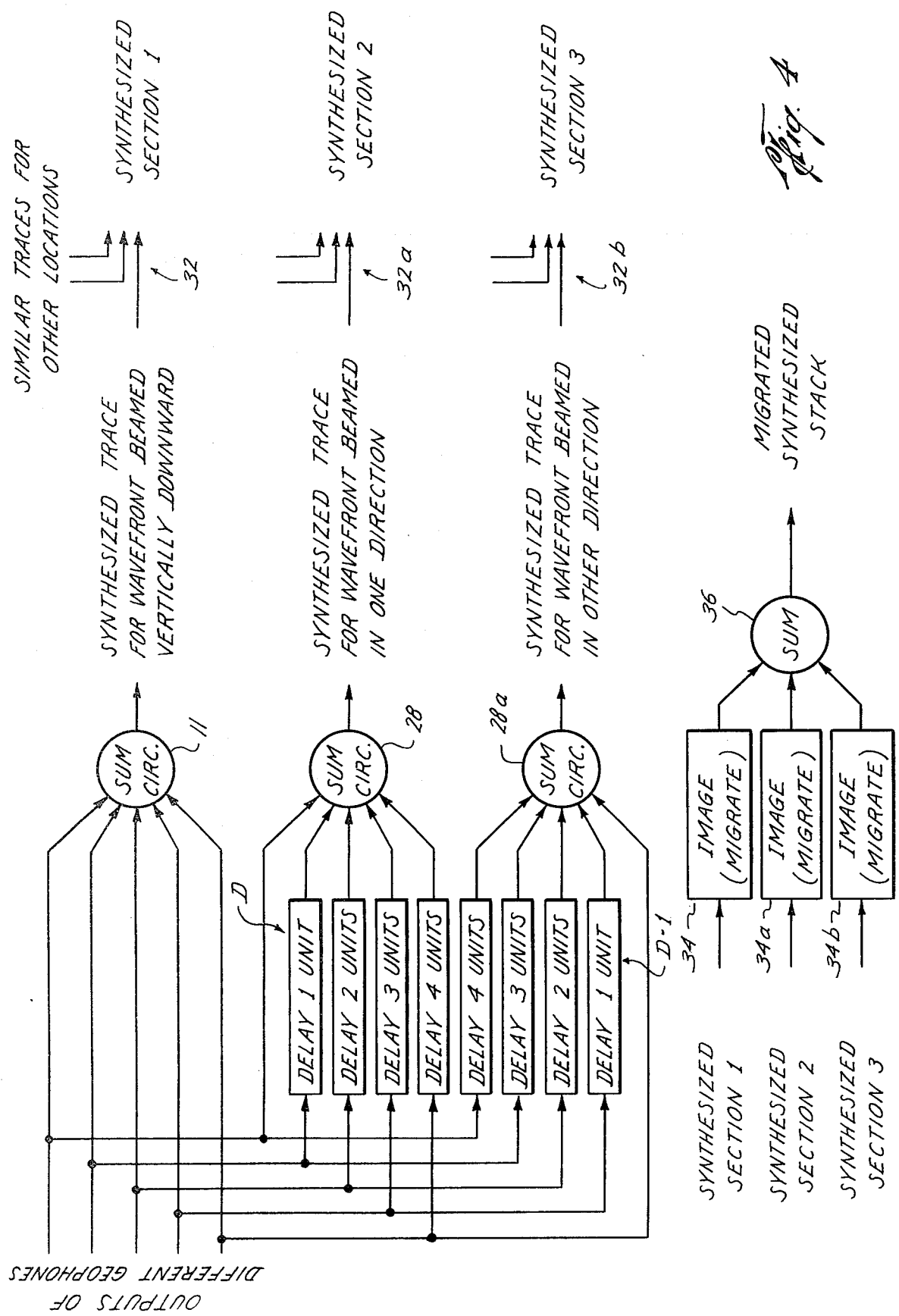

In the past, one highly used seismic data acquisition and processing technique has been common depth point, or CDP, stacking. As discussed above, this technique is predicated on several assumptions that affect the accuracy of displayed data processed in this manner.

Copending U.S. Patent application Ser. No. 548,572 and U.S. Pat. No. 4,072,922, each assigned to the assignee of the present application, deal with obtaining the response of subsurface formations to simulated plane or cylindrical seismic waves. It has been found that these methods allow production of seismic sections which have the following advantages: there is no dependence on stacking velocity data; there is attenuation of horizontal waves; and there is no distortion of amplitudes or waveforms.

With the present invention, applicants have found that the techniques of simulated plane or cylindrical wave simulation can be utilized as a basis for further processing, to be set forth below, to obtain multi-dimension (i.e. two- or three-dimension) imaged seismic data.

In performing the present invention, an initial step is to transmit seismic waves in any suitable manner into subsurface formations either beneath land or submerged beneath bodies of water. The transmitting may be performed during split spread or end-on recording.

Reflected seismic signals are then received from the formations with a line of geophones distributed uniformily over a distance greater than the first Fresnel zone, in the manner disclosed in the above-mentioned U.S. Pat. No. 4,072,922. The received outputs for the geophones along a line of profile 10 (FIG. 2) are then summed in a suitable summing circuit 11 (FIG. 1) or mechanism to form a single output signal (as indicated schematically in FIG. 1) representing the synthesized response of subsurface formations at a mid-point 12 (FIG. 2) of the geophones to a cylindrical wavefront 14.

With the present invention, applicants have discovered two factors with respect to data obtained in the foregoing manner. Based on these factors, seismic data may be processed to accomplish two two- or three-dimensional imaging or migration of seismic data.

The first of these two factors is that data obtained in the foregoing manner image or migrate to correct locations regardless of whether the wavefront is steered. Random noise elements in the data appear differently, however, depending on steering. Applicants have found that if data obtained in the manner discussed above are steered in several directions, including vertically downward, they may be then migrated individually. The resulting migrated sections may then be stacked, affording an improvement in signal-to-noise ratio in the data.

The second of these factors discovered by applicants is that when a number of parallel lines are obtained in surveying an area, they may be processed in the foregoing manner without requiring any limiting assumption regarding cross-dip, because the processing is physically realizable, since the resulting data represent what could actually occur in the earth rather than being subject to modifying assumptions as implicit in CDP stacking. Each of the lines so obtained can be steered individually, or data from each line can be steered at any of several angles with respect to the in-line direction and then be migrated. The migrated data along any of these lines can come from any direction perpendicular to the line-that is, the migrated formations causing events may lie below the line of profile or off to either side.

The data for any arrival time can be thought of as lying somewhere on a cylindrical surface much as those identified by reference numerals 16, 18 and 20 (FIG. 5) centered on each of their respective lines of profile 22, 24 and 26. The surfaces are cylindrical if velocity is constant and are pseudo-cylindrical otherwise. The data for the same event on adjacent lines also lie on cylinders centered about the respective lines, with the radii of the cylinders varying as the lines get closer to or farther away from the actual positions of the reflector which gives rise to the event. Applicants have found that the surface which is the common tangent to these cylinders, which can be found by applying a suitable migration technique, (to be set forth) is the location of the reflecting interface and thus three-dimensional migration of seismic data may be obtained.

Accordingly, in the present invention, in parallel with the summing in circuit 11, the geophone outputs obtained along line of profile 10 pass through delay lines D which delay each geophone's output by an amount proportional to its location along the line, and the delayed results are then summed in a summing circuit 28, to form another synthesized single trace output for a beamed wavefront, synthesizing the results obtained by a recording at the shotpoint 12 for a conical wavefront 30 (FIG. 3) generated by a long linear charge along the shot line 10 with the detonation proceeding along the charge at a specified speed, thereby performing wavefront steering on the seismic data. Wavefront steering in the foregoing manner may be repeated several times with the proportional delay changed thus changing to a different detonation speed along the line 10 and, in effect, changing the pitch of the conical wavefront 30.

Also, the amount of delay imposed on the geophones may be reversed in order, as indicated in delay lines D-1 (FIG. 1) and summed in a summing circuit 28a to synthesize a trace for a wavefront beamed in the other direction, synthesizing the response of subsurface formations to detonation of a line charge in an opposite direction along the line of profile 10, as indicated in FIG. 1. Wavefront steering may be regulated for different or changed amounts of proportional delay and conical wavefronts of differing pitch may also be obtained in the opposite direction.

The foregoing steps are repeated for a group or series of shotpoint locations, and the synthesized traces, both beamed or steered and non-steered are collected as indicated at 32 in FIG. 1, to generate plural synthesized seismic sections of the same line, one each for the times a summing step is performed for different or reversed delay, as indicated at 32a and 32b, in addition to that for a wavefront beamed vertically downward. The several resulting synthesized seismic sections are individually imaged (migrated) as indicated at 34, 34a and 34b (FIG. 4) by a suitable migration process, such as the wave-equation migration process.

Suitable migration processes are disclosed, for example, in "Introduction to Geophysical Prospecting", pages 238–250, Dobrin, McGraw-Hill, 3d Edition, New York, 1976 and in "Applied Geophysics", pages 359–362, Telford et al., Cambridge University Press, New York, 1976.

The results so obtained from migration are seismic sections wherein the data image to the correct locations regardless or whether steering was involved. The several resulting migrated sections are then summed together in a summing circuit 36 to form a migrated, synthesized stack. The coherent data elements such as reflections in the data will stack or add in-phase during summing whereas random noise elements will be attenuated, so that an improvement in signal-to-noise ratio is obtained in the data.

The resulting section is thus a two-dimensionally migrated section which contains all reflection and diffraction elements in their correct location in the in-line direction but without allowance for the cross-line components. In order to obtain three-dimensionally migrated sections a number of lines parallel to the first group of lines are obtained in the same manner. These lines should be close enough together that reflections with some amount of expected cross dip do not permit spatial aliasing. Two-dimensionally migrated seismic sections are then obtained by locating common tangents for wavefronts for the several parallel lines in the manner set forth above.

The migrated sections are then sorted out according to shotpoint coordinate values in the in-line direction (using a common origin for all of the lines). The data for any one common shotpoint coordinate value lie in the same plane, one perpendicular to the seismic lines. Accordingly, seismic data for multiple planes perpendicular to the seismic lines may be obtained, one for each of the shotpoints having common co-ordinates. The data in each of these planes is then imaged (migrated) by some suitable migration process of the type set forth above and summed to obtain migrated synthesized stacks for lines perpendicular to the lines of profile. The results so obtained thus represent seismic sections exhibiting three dimensional migration.

It should be understood that the number of geophones whose outputs are processed in the manner shown in FIG. 1 is given by way of example only, and that any suitable number may be processed in accordance with the present invention. The amounts of delay and the order of delay imposed on these geophone outputs may be varied or altered, as has been set forth. Also, the number of simulated sections obtained in accordance with FIG. 1 and processed as shown in FIG. 3 may be varied, if desired. Finally, the number of in-line migrated synthesized stack processed in the manner of FIG. 6 may be increased or varied, if desired.

The foregoing disclosure and description of the invention are illustrative and explanatory thereof, and various changes evident to those in the art in the described acquisition and processing as well as in the details of the illustrated processing techniques may be made without departing from the spirit of the invention.

We claim:

1. A method of obtaining, from data acquired by transmitting seismic waves into subsurface formations and receiving reflected seismic signals from the formations with a line of geophones distributed uniformly over a distance greater than a first Fresnel zone for the seismic waves, multi-dimensional imaged seismic data, comprising the steps of:
    (a) summing the signals received at each geophone along the line to form a synthesized trace;
    (b) delaying in time the reflected singals for each geophone according to the position of the geophone along the line to wavefront steer the reflected signals;
    (c) summing the wavefront steered signal for each geophone along the line to form a synthesized trace for a beamed wavefront;

(d) repeating the foregoing steps for a series of shotpoint locations along a line of profile to generate a plurality of synthesized traces;

(e) collecting sets of the synthesized traces to form a plurality of synthesized sections;

(f) individually migrating each of the plurality of synthesized sections; and (g) summing the data contents of the plurality of synthesized sections to form a migrated two-dimensional seismic section.

2. The method of claim 1, further including the step of:

repeating each of the foregoing steps for a plurality of parallel lines of profile.

3. The method of claim 2, further including the step of:

sorting the data obtained into groups according to shotpoint locations having common in-line co-ordinates along the line of profile to form seismic sections transverse to the lines of profile.

4. The method of claim 3, further including the step of:

migrating the transverse seismic sections to obtain three-dimensional migrated seismic data.

5. The method of claim 1, further including the steps of:

(a) repeating said step of delaying for different amounts of delay between geophone position to obtain different wavefront steered signals; and (b) summing the wavefront steered signals for each different amount of delay.

6. A method of obtaining, from data acquired by transmitting seismic waves into subsurface formations and receiving reflected seismic signals from the formations with a line of geophones distributed uniformly over a distance greater than a first Fresnel zone for the seismic waves for a number of parallel lines of geophones, multi-dimensional imaged seismic data having reflection events presented in their actual location, comprising the steps of:

(a) summing for each of the lines the signals received at each geophone along the line to form a synthesized trace;

(b) repeating for each line the foregoing steps for a series of shotpoint locations along the line of profile to generate a plurality of synthesized seismic sections;

(c) individually migrating each of the plurality of synthesized seismic sections;

(d) sorting the migrated sections according to shotpoint co-ordinate values to form data for multiple planes perpendicular to the lines of profile;

(e) migrating the data for the planes perpendicular to the lines of profile;

(f) summing the migrated data for the planes perpendicular to the lines of profile to thereby form three-dimensional migrated seismic sections.

* * * * *